United States Patent

[11] 3,604,413

[72] Inventors: Karlheinz Burg, Hofheim-Taunus; Harald Cherdron, Wiesbaden; Johannes Brandrup, Neu-Isenburg, all of, Germany
[21] Appl. No.: 825,075
[22] Filed: May 15, 1969
[45] Patented: Sept. 14, 1971
[73] Assignee: Farbwerke Hoechst Aktiengesellschaft vormals Meister Lucius & Bruning, Frankfurt/Main, Germany
[32] Priority: May 24, 1968
[33] Germany
[31] P 17 67 564.8

[54] PROCESS FOR THE PREPARATION OF STIFF SUPPORTING BANDAGES CONTAINING A THERMOPLASTIC MOULDING COMPOSITION
2 Claims, No Drawings

[52] U.S. Cl. .................................................. 128/90, 18/55.05, 260/338

[51] Int. Cl. .................................................. A61f 5/04
[50] Field of Search .......................... 128/90, 82; 260/338 X; 18/55.05

[56] References Cited
UNITED STATES PATENTS
3,490,444  1/1970  Larson .................. 128/90

Primary Examiner—Richard A. Gaudet
Assistant Examiner—J. Yasko
Attorney—Curtis, Morris & Safford ABSTRACT: Copolymers of trioxane with determined cyclic formals are used for making stiff supporting bandages. The thermoplastic-moulding compositions are applied in the plasticized state without a carrier material or together with a fabric to the part of the body to be treated and then allowed to solidify.

PROCESS FOR THE PREPARATION OF STIFF SUPPORTING BANDAGES CONTAINING A THERMOPLASTIC MOULDING COMPOSITION

The present invention relates to stiff supporting bandages containing a thermoplastic-moulding composition and to a process for their preparation.

After setting bone fractures and for splinting dislocations, the injured part of the body is fixed in the most favorable position for the healing process with the help of a plaster of Paris dressing. For this purpose, a muslin bandage coated with plaster of Paris is soaked in water, squeezed and then applied in several layers such that the desired immobility of the injured part is obtained. These plaster of Paris dressings have, however, certain disadvantages. When applying the dressing, embarrassing splashing is inevitable. The dressing takes about 1 to 1 ½ hours to solidify to such a degree that the fractured ends of the bone, for example, can no longer be displaced. The dressing reaches its highest strength only after several days. During drying, the treated part of the body is cold and moist. To ensure the desired stability of the dressing, the latter must have a sufficient weight and size, which is burdensome and cumbersome for the patient. Finally, plaster of Paris dressings have the great disadvantage that they are difficulty permeable to X rays.

German Auslegeschrift Pat. No. 1,212,674 described the preparation of impregnated bandages, in which a hard plastic obtained by emulsion polymerization, for example, polymethylmethacrylate or polystyrene, is applied to a fabric and the polymer particles are then fixed by a binder in a manner such that there is not formed a coherent plastic film so that the original softness and flexibility of the fabric is maintained. The supporting bandage is obtained with this material by applying the impregnated bandage while partially dissolving the hard plastic with an appropriate solvent. After evaporation of the solvent a rigid film is obtained. This process has the disadvantage that the skin is irritated by the solvents, particularly in the case of an open wound, and that long times of drying are required.

In German Auslegeschrift Pat. No. 1,165,810 a fabric coated with a plastic is hardened by impregnation with an emulsion of a polymerizable compound and water in the presence of a fast-acting polymerization accelerator. This process is not only complicated, but also has the drawback that a residual amount of unpolymerized monomer is left which may give rise to skin irritations and allergies.

The present invention provides a thermoplastic moulding composition for making stiff supporting bandages, comprising a copolymer of 1 mole of 1,3,5-trioxane and 0.7 to 2.8 moles of a cyclic formal of the following formula

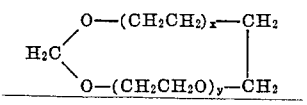

in which the sum of $x$ and $y$ is zero or one, the melting point of the copolymer being within the range of from 40° to 80° C.

The copolymers of trioxane with the cyclic formals 1,3-dioxolane, 1,3-dioxepane and 1,3,6-trioxocane to be used in accordance with the invention, have a melting point within the range of from 40° to 80° C., the best results being obtained with those having a melting point of 60° to 75° C. The melting point can easily be adjusted by varying the proportion of the component. For a melting range of from 40° to 80° C., 0.7 to 2.8 moles formal are needed for 1 mole trioxane. The reduced specific viscosity (RSV) of the trioxane copolymers, measured at 140° C. in butyrolactone with a concentration of 0.5 g./100 ml., is advantageously within the range of from 0.3 to 1.5, preferably 9.6 to 1.0 dl/g.

For making stiff supporting bandages, the moulding compositions to be used in accordance with the invention are applied to a fabric and then heated to a temperature of 60° to 80° C., for example, on a hot water bath or a heated metal plate or by heat radiation or hot air, to render the trioxane copolymer plastic. The coated fabric is then applied to the part to be immobilized and solidifies within 15 to 20 minutes to a rigid dressing. Depending on the desired strength of the bandage, several layers of fabric must be applied. The thermoplastic-moulding composition remains sufficiently long in the plastic state to obtain a good bond between the layer already applied and the new one.

The bandage may also be applied in a manner such that the fabric coated with the copolymer of trioxane and a formal of the above formula is wound up together with a film or sheet to which the polyacetal does not adhere in the plastic state and that the whole fabric is then heated to a temperature within the range of from 60° to 80° C. The "plastic" fabric can then be applied to the part to be immobilized and the film or sheet separating the individual layers of the coated fabric can be removed.

As carrier material for the copolymers to be used in accordance with the invention, fabrics of, for example, cotton, wool, cellulose acetate, polyesters or polyacrylonitrile may be used. The weight of these fabrics is within the range of from 1 to 100 g./m.², preferably 10 to 50 g./m.². Advantageously, a cotton fabric, for example, in the form of a muslin bandage, is used. The fabric is coated with the copolymers to be used in accordance with the invention by known methods by extrusion followed by calendering.

It is also possible to heat the thermoplastic-moulding composition without a carrier to a temperature of 40° to 80° C. and to use the plastic mass so obtained for making the dressing.

As compared with the known supporting bandages, the moulding composition to be used in accordance with the invention has the following advantages: splashing is avoided when applying the bandage, the bandage solidifies more rapidly, has a lower weight and is permeable to X rays. The permeability to X rays offers the possibility to examine, after the supporting bandage has been applied, whether, for example, fractured bone ends are correctly oriented to one another. If a correction is necessary, the dressing can easily be replasticized with the help of a hot-air drier or an infrared lamp, the desired correction may be made and the dressing may be allowed to solidify again. Finally, the removal of the supporting bandage can be carried out in a simpler and cleaner manner because the dressing can be rendered plastically moldable in the above manner and can then easily be removed without disturbing the supported part of the body.

The following examples serve to illustrate the invention, but are not intended to limit it.

EXAMPLE 1

A copolymer of 45 percent by weight trioxane and 55 percent by weight 1,3-dioxolane having a reduced viscosity $\eta$ red. of 0.50 dl./g. determined at 140° C. in butyrolactone in a concentration $c$ of 0.5 g./100 ml., was applied by extrusion to a cotton fabric (weight 35 g./m.²) having 15 threads/cm. in the direction of the filling and 10 threads/cm. in the direction of the warp, and the whole was then calendered to obtain a coated fabric of a weight of 530 g./m.². The coated fabric contained 93 percent by weight trioxane copolymer.

By heating the bandage to 80° C. on a heated metal plate the plastic contained in the bandage was rendered plastically moldable. After cooling to a temperature of 40° to 50° C., the bandage could be applied to a part of the body to be immobilized. After 15 to 20 minutes the bandage had solidified. To remove it, the plastic was replasticized with the help of an infrared lamp and the soft bandage was cut open.

EXAMPLE 2

A copolymer of 45 percent by weight trioxane and 55 percent by weight 1,3-dioxolane ($\eta$ red.=1.10 dl./g.; conditions as described in example 1) was plasticized on a water bath having a temperature of 80° C. After cooling to a temperature of 40° to 50° C., the material was applied to a part of the body to be immobilized. After 20 to 30 minutes the trioxane copolymer had solidified to a stiff supporting bandage. The dressing was removed as described in example 1.

We claim:
1. In a process for making a stiff supporting bandage which comprises heating a thermoplastic material to a plastic state, applying it to the part of the body to be supported and protected, and allowing it to solidify to a rigid state, the improvement wherein the thermoplastic material is a copolymer of 1,3,5-trioxane and a cyclic formal having the formula

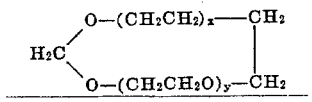

in which the sum of $x$ and $y$ is zero or one, the molar ratio of trioxane to formal being from 1:0.7 to 1:2.8, and the heating is to a temperature within the range of from 40° to 80° C.

2. In a process for making a stiff supporting bandage which comprises coating a thermoplastic material onto a fabric, heating the thermoplastic material to a plastic state, applying the heated, coated fabric to the part of the body to be supported and protected, and allowing it to solidify to a rigid state, the improvement wherein the thermoplastic material is a copolymer of 1,3,5-trioxane and cyclic formal having the formula

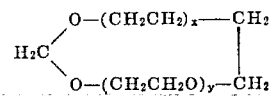

in which the sum of $x$ and $y$ is zero or one, the molar ratio of trioxane to formal being from 1:0.7 to 1:2.8, and the heating is to a temperature within the range of from 60° to 80° C.